(12) United States Patent (10) Patent No.: US 12,586,320 B2

Ha (45) Date of Patent: Mar. 24, 2026

(54) LIGHTWEIGHT OPTICAL DEVICE FOR AUGMENTED REALITY USING STATE CHANGE OPTICAL ELEMENT

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 496 days.

(21) Appl. No.: 18/009,098

(22) PCT Filed: Mar. 18, 2021

(86) PCT No.: PCT/KR2021/003358

§ 371 (c)(1),
(2) Date: Dec. 8, 2022

(87) PCT Pub. No.: WO2021/261710

PCT Pub. Date: Dec. 30, 2021

(65) Prior Publication Data

US 2023/0237745 A1    Jul. 27, 2023

(30) Foreign Application Priority Data

Jun. 24, 2020    (KR) ........................ 10-2020-0076941

(51) Int. Cl.
*G06T 19/00*    (2011.01)
*G02B 27/01*    (2006.01)

(52) U.S. Cl.
CPC ........ *G06T 19/006* (2013.01); *G02B 27/0172* (2013.01)

(58) Field of Classification Search
CPC ...... G02F 1/167; G09G 3/3208; G09G 3/344; G02B 5/26; G02B 2027/0178; G02B 5/20; G02B 27/01; G02B 27/0172; G06T 19/006

See application file for complete search history.

(56) References Cited

U.S. PATENT DOCUMENTS

2014/0111864 A1    4/2014   Margulis et al.
2015/0138248 A1*   5/2015   Schrader ................. G06F 3/013
                                                          345/690

(Continued)

FOREIGN PATENT DOCUMENTS

CN        105785573 A    7/2016
CN        105899998 A    8/2016
                (Continued)

*Primary Examiner* — Jonathan Y Jung

(74) *Attorney, Agent, or Firm* — Rabin & Berdo, P.C.

(57)    ABSTRACT

The present invention relates to an optical device for augmented reality, and provides a lightweight optical device for augmented reality using a state change optical element, the lightweight optical device including: an optical means configured to transmit at least part of real object image light therethrough toward the pupil of an eye of a user; and a reflective unit disposed inside the optical means, and configured to transfer augmented reality image light, output from an image output unit, toward the pupil of the eye of the user by reflecting the augmented reality image light, thereby providing an image for augmented reality to the user; wherein the reflective unit is formed of a state change optical element whose reflectance for the reflection of light and transmittance are changed in response to a control signal of a controller.

8 Claims, 15 Drawing Sheets

(56)                References Cited

U.S. PATENT DOCUMENTS

| | | | |
|---|---|---|---|
| 2017/0322417 A1 | 11/2017 | Sekiguchi et al. | |
| 2020/0355976 A1* | 11/2020 | Ishii | G02F 1/155 |
| 2021/0033939 A1* | 2/2021 | Hasegawa | G09G 3/38 |
| 2022/0174764 A1* | 6/2022 | Huang | G02B 27/0172 |
| 2022/0214550 A1* | 7/2022 | Machida | G02B 5/18 |

FOREIGN PATENT DOCUMENTS

| | | | | | |
|---|---|---|---|---|---|
| JP | 2016110108 | A | | 6/2016 | |
| JP | 2018041096 | A | | 3/2018 | |
| JP | 6314035 | B2 | | 4/2018 | |
| JP | 2021021872 | A | * | 2/2021 | G02F 1/163 |
| KR | 101660519 | B1 | | 9/2016 | |
| KR | 10-2017-0092518 | A | | 8/2017 | |
| KR | 1020180028339 | A | | 3/2018 | |
| KR | 10-2018-0085663 | A | | 7/2018 | |
| KR | 102099785 | B1 | | 4/2020 | |
| TW | M547679 | U | | 8/2017 | |
| WO | 2019221539 | A1 | | 11/2019 | |

* cited by examiner

100

REAL OBJECT IMAGE LIGHT

10

20

30

AUGMENTED REALITY
IMAGE LIGHT

AUGMENTED REALITY
IMAGE LIGHT

40

PUPIL

TRANSMISSION OF LIGHT

REFLECTION OF LIGHT (a) MIRROR    (b) HALF MIRROR    (c) TRANSPARENT

LIGHTWEIGHT OPTICAL DEVICE FOR AUGMENTED REALITY USING STATE CHANGE OPTICAL ELEMENT

TECHNICAL FIELD

The present invention relates to an optical device for augmented reality, and more particularly to a lightweight optical device for augmented reality using a state change optical element in which a reflective unit configured to provide an image for augmented reality is implemented using a state change optical element, so that the state of the reflective unit can be adjusted to a full mirror, translucent, or transparent state as needed.

BACKGROUND ART

Augmented reality (AR) refers to technology that superimposes a virtual image, provided by a computer or the like, on a real image in the real world and then provides a resulting image, as is well known.

In order to implement augmented reality, there is required an optical system that allows a virtual image, generated by a device such as a computer, to be superimposed on an image in the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a prism capable of adjusting focal length for a virtual image and electrically controlling a variable focal lens in response to a change in focal length. However, these technologies also have a problem in that a user needs to perform a separate operation in order to adjust focal length or in that hardware such as a separate processor and software for controlling focal length are required.

In order to overcome the above-described problems of the conventional technologies, the present applicant has developed a device capable of implementing augmented reality by projecting a virtual image onto the retina through the pupil using a reflective unit having a size smaller than that of a human pupil, as described in patent document 1.

FIG. 1 is a diagram showing an optical device 100 for augmented reality such as that disclosed in patent document 1.

The optical device 100 for augmented reality, which is shown in FIG. 1, includes an optical means 10, a reflective unit 20, an image output unit 30, and a frame unit 40.

The optical means 10 is a means for transmitting at least part of real object image light, which is image light output from a real object, therethrough, and may be, e.g., a lens of eyeglasses. The reflective unit 20 is disposed to be embedded inside the optical means 10. Furthermore, the optical means 10 also functions to transmit the augmented reality image light, output from the image output unit 30 and reflected by the reflective unit 20, therethrough in order to transfer the augmented reality image light to the pupil.

The frame unit 40 is a means for fixing and supporting both the image output unit 30 and the optical means 10, and may be, e.g., an eyeglass frame.

The image output unit 30 is a means for outputting augmented reality image light, which is image light corresponding to an image for augmented reality. For example, the image output unit 30 may include a small display device configured to display an image for augmented reality on a screen and radiate augmented reality image light, and a collimator configured to collimate the image light, radiated from the display device, into parallel light.

The reflective unit 20 reflects image light corresponding to an image for augmented reality, output from the image output unit 30, toward a pupil of a user, thereby allowing the user to view the image for augmented reality.

The reflective unit 20 of FIG. 1 is formed to have a size equal to or smaller than that of the average pupil of people, i.e., 8 mm or less. By forming the reflective unit 20 to be smaller than the average pupil as described above, the depth of field for light entering the pupil through the reflective unit 20 may be made almost infinite, i.e., considerably deep.

In this case, the depth of field refers to a range within which an image for augmented reality is recognized as being in focus. When the depth of field increases, a focal distance for an image for augmented reality get increased accordingly. Thus, even when a user changes the focal distance for the real world while gazing at the real world, the user always recognizes an image for augmented reality as being in focus regardless of such a change. This may be viewed as a type of pinhole effect. Accordingly, even when the user changes the focal length while gazing at a real object present in the real world, the user can always view a clear virtual image for an image for augmented reality.

However, in this configuration, the reflective unit 20 needs to transfer augmented reality image light to the pupil by reflecting the augmented reality image light, and thus the material of the reflective unit 20 needs to be made of a material that reflects light. Accordingly, even when the reflective unit 20 is formed in a small size, it is inevitably visible when viewed from the outside. For this reason, when the optical device 100 for augmented reality shown in FIG. 1 is implemented in the form of glasses, it gives an extraneous feeling, and thus a problem arises in that it is difficult to utilize the optical device 100 for augmented reality as general glasses.

In addition, a problem arises in that the transmittance for real object image light is slightly lowered due to the reflective unit 20 from the perspective of a user who uses the optical device 100 for augmented reality.

PRIOR ART DOCUMENT (Patent Document 1) Korean Patent No. 10-1660519 (published on Sep. 29, 2016)

DISCLOSURE

Technical Problem

The present invention is intended to overcome the above-described problems, and an object of the present invention is to provide a lightweight optical device for augmented reality using a state change optical element in which a reflective unit configured to provide an image for augmented reality is implemented using a state change optical element, so that the state of the reflective unit can be adjusted to a full mirror, translucent, or transparent state as needed.

Another object of the present invention is to provide a lightweight optical device for augmented reality using a state change optical element which allows the degree of transmission of real object image light to be adjusted using a state change optical element, so that an image for augmented reality can be recognized as being more natural.

Technical Solution

In order to accomplish the above objects, the present invention provides a lightweight optical device for augmented reality using a state change optical element, the lightweight optical device including: an optical means configured to transmit at least part of real object image light therethrough toward the pupil of an eye of a user; and a reflective unit disposed inside the optical means, and configured to transfer augmented reality image light, output from an image output unit, toward the pupil of the eye of the user by reflecting the augmented reality image light, thereby providing an image for augmented reality to the user; wherein the reflective unit is formed of a state change optical element whose reflectance for the reflection of light and transmittance are changed in response to a control signal of a controller.

In this case, the reflective unit may include: a first substrate made of a transparent material; a second substrate disposed to face the first substrate; a first electrode formed on the first substrate, and made of a transparent material; a second electrode formed on the second substrate, and made of a transparent material; and an electrolyte including metal ions contained in a space between the first and second electrodes; and the first and second electrodes may be electrically connected to the controller.

Furthermore, when a voltage is applied from the controller to the first and second electrodes, the metal ions included in the electrolyte may be electrodeposited on one of the first and second electrodes, and may form a metal thin film.

Furthermore, the reflectance and transmittance of the reflective unit may be each changed in the range of 0 to 100%.

Moreover, the reflective unit may include a plurality of reflective units, and the reflectance and transmittance of at least some of the reflective units are different from those of the one or more remaining reflective units.

According to another aspect of the present invention, there is provided a lightweight optical device for augmented reality using a state change optical element, the lightweight optical device including: an optical means configured to transmit at least part of real object image light therethrough toward the pupil of an eye of a user; a reflective unit disposed inside the optical means, and configured to transfer augmented reality image light, which is image light corresponding to an image for augmented reality output from an image output unit, toward the pupil of the eye of the user by reflecting the augmented reality image light, thereby providing the image for augmented reality to the user; and a light transmission adjustment means disposed on the outer or inner surface of the first surface of the optical means on which the real object image light is incident; wherein the light transmission adjustment means is formed of a state change optical element whose reflectance for the reflection of light and transmittance are changed in response to a control signal of a controller.

In this case, the reflectance and transmittance of the light transmission adjustment means may be each changed in the range of 0 to 100%.

Furthermore, the reflective unit may be formed of a state change optical element whose reflectance for the reflection of light and transmittance are changed in response to a control signal of the controller.

Furthermore, the reflectance and transmittance of the reflective unit may be each changed in the range of 0 to 100%.

Furthermore, the reflectance and transmittance of the region of the light transmission adjustment means corresponding to the reflective unit may be changed.

Moreover, the reflectance and transmittance of the region of the light transmission adjustment means other than the region of the light transmission adjustment means corresponding to the reflective unit may be changed.

Advantageous Effects

According to the present invention, there is provided the lightweight optical device for augmented reality using a state change optical element in which the reflective unit configured to provide an image for augmented reality is implemented using the state change optical element, so that the state of the reflective unit can be adjusted to a full mirror, translucent, or transparent state as needed.

Furthermore, the present invention has the effect of providing the lightweight optical device for augmented reality using a state change optical element which allows the degree of transmission of real object image light to be adjusted using the state change optical element, so that an image for augmented reality can be recognized as being more natural.

In particular, according to the present invention, the transmittance and reflectance of the reflective unit can be adjusted using the state change of the reflective unit, so that the optical device for augmented reality can be implemented in general glasses without a considerable change.

BEST MODE

Embodiments according to the present invention will be described in detail below with reference to the accompanying drawings.

Figure 1:
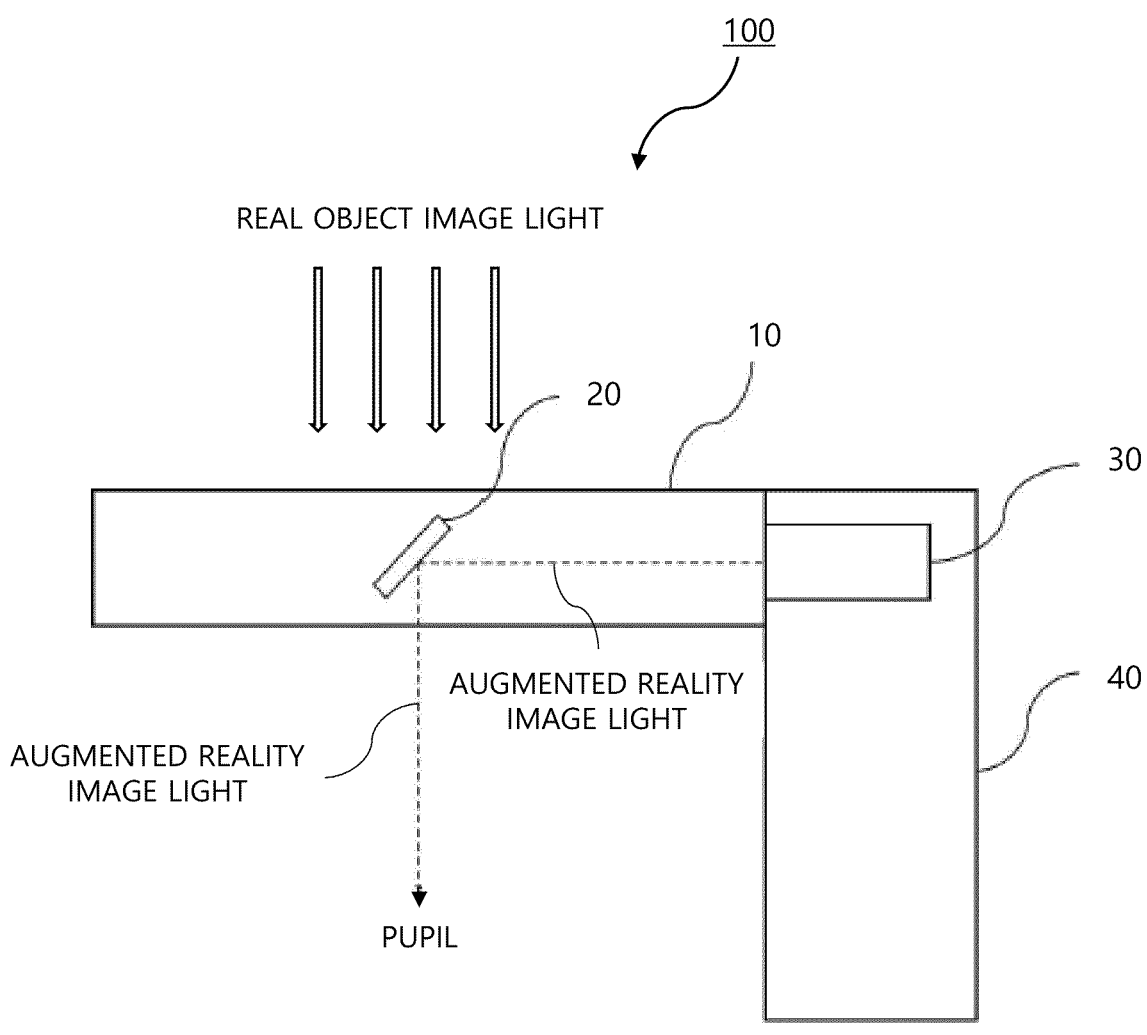
FIG. 1 is a diagram showing an optical device (100) for augmented reality such as that disclosed in patent document 1.
Figure 2:
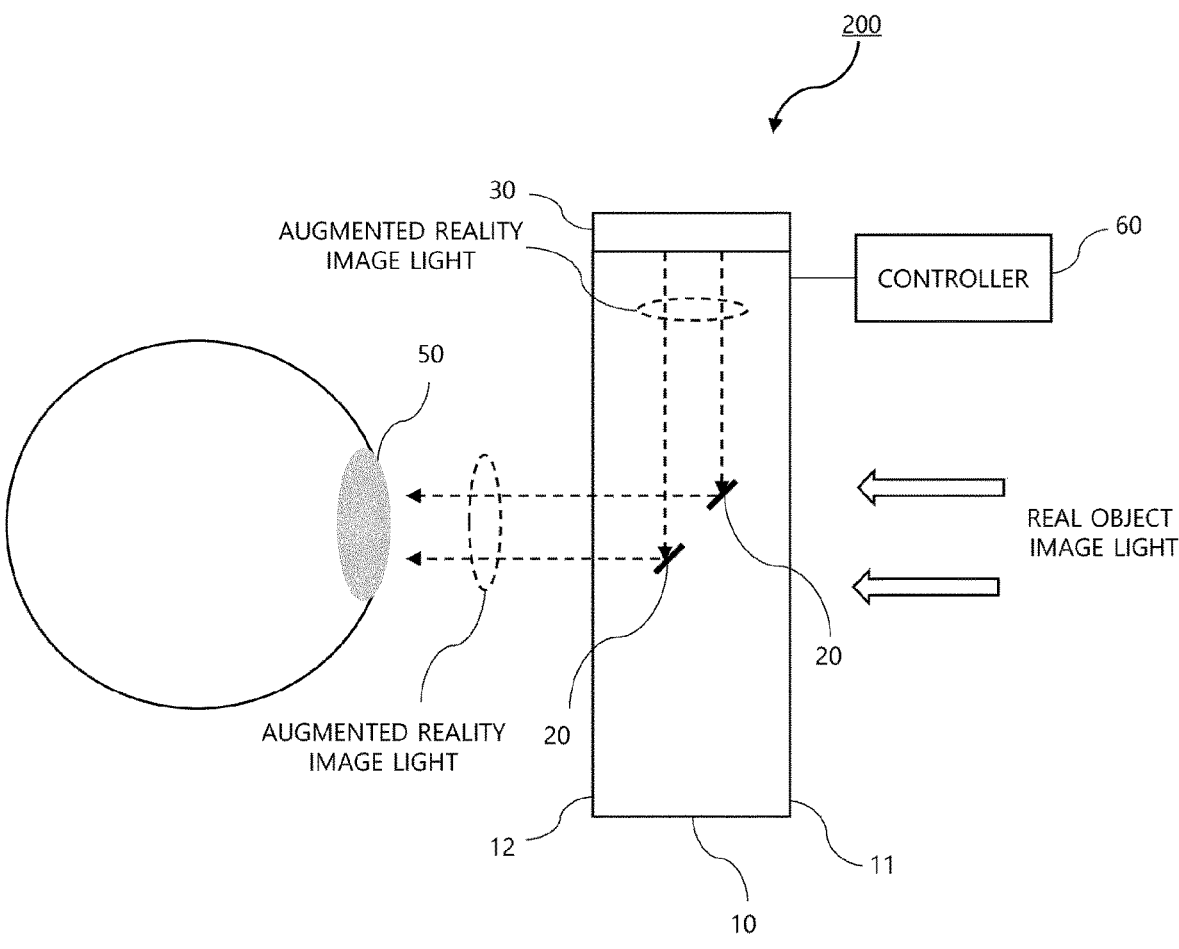
FIG. 2 is a diagram showing the configuration of an optical device (200) for augmented reality using a state change optical element according to an embodiment of the present invention.

FIG. 2 is a diagram showing the configuration of a lightweight optical device 200 for augmented reality using a state change optical element according to an embodiment of the present invention.

Referring to FIG. 2, the lightweight optical device 200 for augmented reality using a state change optical element (hereinafter simply referred to as the "optical device 200 for augmented reality") includes an optical means 10 and reflective units 20.

The optical means 10 is a means for transmitting at least part of real object image light, which is image light output from a real object, therethrough toward the pupil 50 of an eye of a user.

In this case, the fact that at least part of real object image light is transmitted toward the pupil 50 means that the light transmittance of the real object image light does not necessarily need to be 100%.

The optical means 10 is preferably made of a lightweight transparent plastic material in order to implement the lightweight optical device 200 for augmented reality. It is obvious that the optical means 10 may be made of a transparent glass material.

The optical means 10 has first and second surfaces 11 and 12 that are disposed opposite to each other. The first surface 11 is a surface which the real object image light enters, and the second surface 12 is a surface through which the augmented reality image light corresponding to an image for augmented reality reflected by the reflective unit 20 and the real object image light passing through the first surface 11 are output toward the pupil 50 of the eye of the user.

Although the first and second surfaces 11 and 12 of the optical means 10 of FIG. 2 are disposed parallel to each other, this is merely an example, and it is obvious that they may be disposed not parallel to each other.

An image output unit 30 is a means for outputting augmented reality image light, which is image light corresponding to an image for augmented reality, and may be, for example, a display device such as a small LCD. The image output unit 30 may further include a collimator configured to output augmented reality image light, output from a small display device, as parallel light.

Since the image output unit 30 itself is not a direct target of the present invention and is known by prior art, a detailed description thereof will be omitted below.

Here, the image for augmented reality refers to a virtual image corresponding to the augmented reality image light that is output from the image output unit 30 and transferred to the pupil 50 of the user through the reflective units 20. For example, the image for augmented reality may be a still or moving image in the form of an image.

Such an image for augmented reality is transferred to the pupil 50 of the user through the reflective units 20, thereby being provided to the user as a virtual image. At the same time, the user receives real object image light, output from a real object present in the real world, through the optical means 10. Accordingly, the user may be provided with an augmented reality service.

Each of the reflective units 20 is disposed to be embedded in the optical means 10, and is a means for transferring augmented reality image light, corresponding to an image for augmented reality output from the image output unit 30, to the pupil 50 of the eye of the user by reflecting the augmented reality image light, thereby providing the image for augmented reality to the user.

Although the two reflective units 20 are shown as being disposed in FIG. 2, this is merely an example, and it is obvious that the number of reflective units 20 may be one, or three or more.

The reflective units 20 are disposed to be embedded in the optical means 10 at appropriate positions and angles so that they can transfer augmented reality image light, transferred from the image output unit 30, to the pupil 50 of the user by reflecting the augmented reality image light.

In other words, the reflective units 20 are disposed at appropriate angles of inclination with respect to the second surface 12 of the optical means 10 by taking into consideration the positions of the image output unit 30 and the pupil 50 so that they can transfer augmented reality image light, output from the image output unit 30, to the pupil 50 by reflecting the augmented reality image light.

Each of the reflective units 20 is formed to have a size smaller than the size of a human pupil, i.e., 8 mm or less, more preferably 4 mm or less, in order to provide a pinhole effect by increasing the depth of field, as described in the background art section.

In other words, by forming the reflective unit 20 to be smaller than the size of the average pupil of people, the depth of field for light entering the pupil 50 through the reflective unit 20 may be made almost infinite, i.e., considerably deep, so that there may be generated a pinhole effect in which even when a user changes the focal distance for the real world while gazing at the real world, an image for augmented reality is always recognized as being in focus regardless of such a change.

In this case, the size of the reflective unit 20 refers to the maximum length between any two points on the edge boundary of the reflective unit 20.

Furthermore, the size of the reflective unit 20 may be the maximum length between any two points on the edge boundary of the orthogonal projection of the reflective unit 20 projected onto any plane including the center of the pupil 50 while being perpendicular to a straight line between the pupil 50 and the reflective unit 20.

As described above, the size of the reflective unit 20 is formed to be smaller than the size of a human pupil, i.e., 8 mm or less, more preferably 4 mm or less. The minimum size of the reflective unit 20 may be appropriately selected as needed. For example, the size of the reflective unit 20 may be formed to be 700 μm to 4 mm.

Each of the reflective units 20 is disposed such that augmented reality image light transferred from the image output unit 30 is not blocked by the other reflective unit 20, as shown in FIG. 2.

Meanwhile, the sizes of the reflective units 20 do not necessarily need to be the same, and may be partially different from each other.

Furthermore, the surfaces of at least some of the reflective units 20 may be formed as curved surfaces. In this case, the curved surfaces may be concave or convex surfaces.

Furthermore, the angle of inclination of at least some of the reflective surfaces 30 with respect to the optical means 10 may be formed to be different from that of the one or more remaining reflective units 30.

Meanwhile, although the augmented reality image light output from the image output unit 30 is shown as being transferred directly to the reflective unit 20 in the embodiment of FIG. 2, this is merely an example. It is obvious that the augmented reality image light may be reflected at least once by total internal reflection on at least one of the first and second surfaces 11 and 12 of the optical means 10 and then transferred to the reflective unit 20.

Meanwhile, the embodiment of FIG. 2 is characterized in that the reflective units 20 are formed of state change optical elements whose reflectance for the reflection of light and transmittance are changed in response to a control signal of a controller 60.

In this case, the state change optical elements refers to an optical element of which the reflectance and transmittance are adjustable and the state of the optical element can be changed among a full mirror, a completely transparent glass, and a half mirror through which part of the light is reflected and the remaining part is transmitted.

Such state change optical elements may be used in the manufacture of high-efficiency smart windows that effectively block and transmit sunlight according to an external environment, and may be advantageously used in automobile mirrors. Various types of state change optical elements are known by prior art.

As an electrically controllable state change optical element, a reversible electrochemical mirror and a cholesteric liquid crystal mirror are known.

The reversible electrochemical mirror is based on a method of controlling the degrees of reflectance and transmittance by inserting a transparent electrolyte having metal ions between two transparent electrodes and controlling the degree of electrochemical deposition of metal ions on the transparent electrodes using the difference in voltage.

The cholesteric liquid crystal mirror is based on a method of adjusting reflectance and transmittance by controlling the arrangement of cholesteric liquid crystals between transparent electrodes using the difference in voltage between the electrodes.

The present invention is characterized in that the reflectance and transmittance of the reflective units 20 may be variably adjusted by forming the reflective units 20 using state change optical elements, so that reflectance and transmittance for augmented reality image light and real object image light can be changed as needed.

Figure 3:
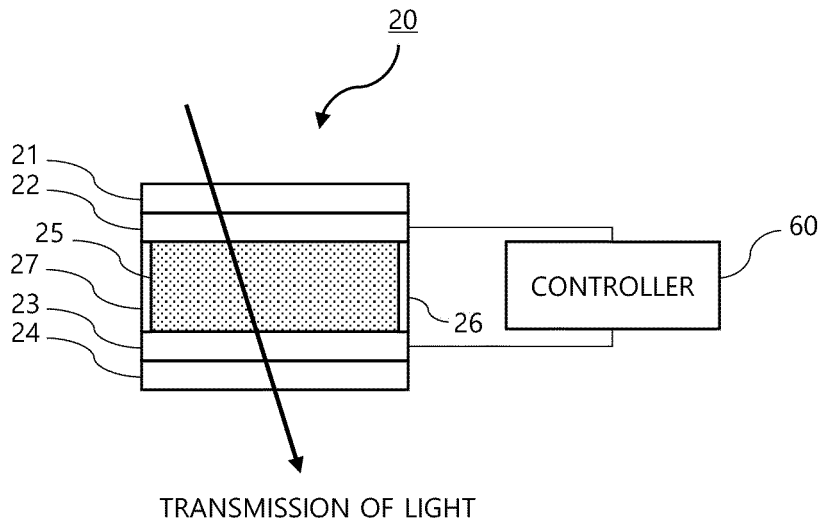
FIGS. 3 and 4 are diagrams illustrating an example of a reflective unit (20) formed of a state change optical element, which corresponds to a case where the reflective unit (20) is formed by an electrochemical method.
Figure 4:
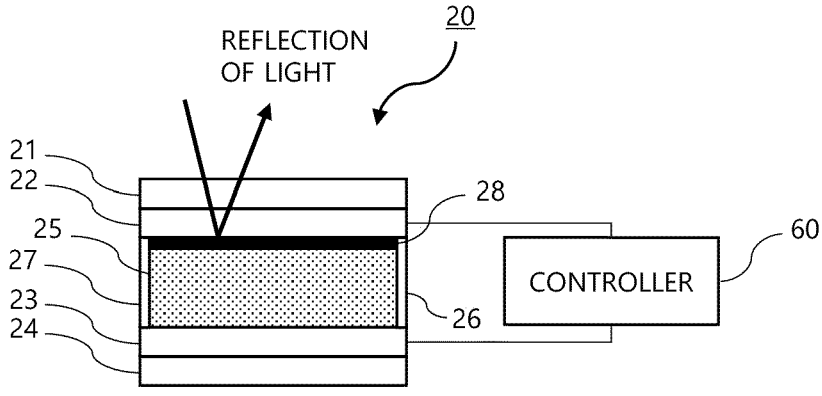

FIGS. 3 and 4 are diagrams illustrating an example of the reflective unit 20 formed of a state change optical element, which corresponds to a case where the reflective unit 20 is formed by an electrochemical method.

Referring to FIGS. 3 and 4, the reflective unit 20 includes a first substrate 21, a first electrode 22, a second electrode 23, a second substrate 24, an electrolyte 25, and spacers 26 and 27.

The first and second substrates 21 and 24 are made of a resin material such as transparent glass or plastic, and are spaced apart from each other and disposed opposite to each other.

The first and second electrodes 22 and 23 are also made of a transparent material, and are electrically connected to the controller 60. The first and second electrodes 22 and 23 and the controller 60 are connected to each other by wires made of a transparent material.

The electrolyte 25 may be made of a transparent electrolyte including, e.g., metal ions such as silver (Ag) ions and copper (Cu) ions.

The spacers 26 and 27 are formed between the first electrode 22 and the second electrode 23, and provide a space for containing the electrolyte 25.

The state of FIG. 3 corresponds to a case where power is not applied from the controller 60. In this case, the electrolyte 25 is in a transparent state, and passes light, entering from the outside, therethrough without any change. In other words, in this case, it may be considered that the reflectance of the reflective unit 20 is 0% and the transmittance thereof is 100%.

In this state, when a control signal, i.e., a voltage, from the controller 60 is applied between the first electrode 22 and the second electrode 23, an electrochemical reduction reaction occurs in the electrolyte 25, and thus metal ions contained in the electrolyte 25 are electrodeposited onto the first electrode 22 and form a metal thin film 28, as shown in FIG. 4.

Accordingly, as shown in FIG. 4, light from the outside is reflected by the metal thin film 28. In this state, it may be considered that the reflectance of the reflective unit 20 is 100% and the transmittance thereof is 0%, so that the reflective unit 20 acts as a full mirror.

In this case, by adjusting a voltage applied by the controller 60, the reflectance and transmittance may be adjusted in the range of 0 to 100%. In this case, the reflective unit 20 acts as a half mirror that reflects part of light and transmits the remaining part, i.e., a translucent mirror.

Figure 5:
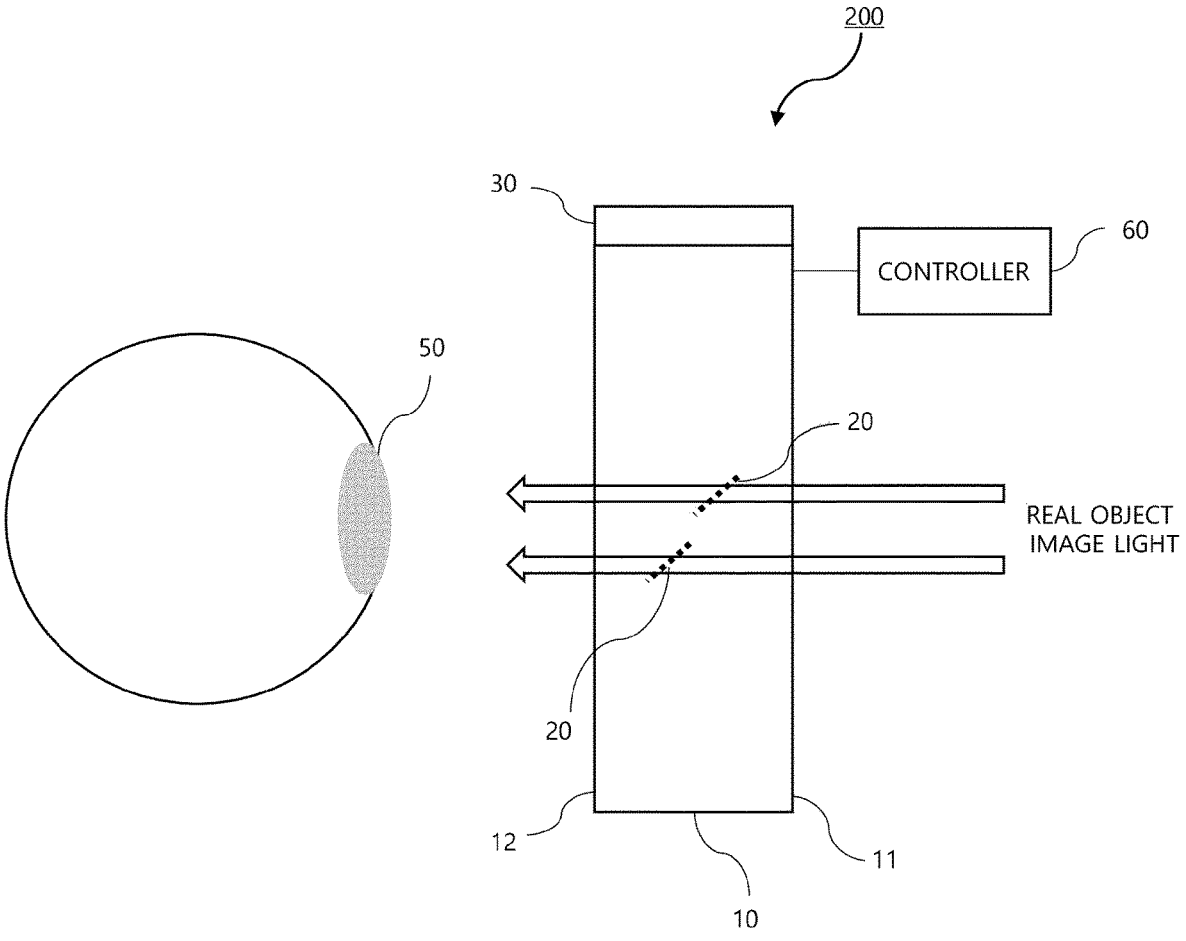
FIG. 5 shows the optical device (200) for augmented reality in a case where the reflectance of the reflective units (20) is 0% and the transmittance thereof is 100% according to the principle described with reference to FIGS. 3 and 5.

FIG. 5 shows the optical device 200 for augmented reality in a case where the reflectance of the reflective units 20 is 0% and the transmittance thereof is 100% according to the principle described with reference to FIGS. 3 and 5.

In FIG. 5, the reflective units 20 are shown by dotted lines, however, this is not intended to show the actual shapes in which the reflective units 20 are viewed, but is intended to indicate that the reflective units 20 are transparent.

As described above, when a voltage is not applied from the controller 60 to each of the reflective units 20 formed of state change optical elements, the reflectance of the reflective unit 20 is 0%, and the transmittance thereof is 100%. In this case, the reflective unit 20 is in a state in which it cannot reflect augmented reality image light. Accordingly, real object image light passed through the reflective unit 20 may be passed through the reflective unit 20 without any change and then transferred to the pupil 50. Therefore, in this case, the image output unit 30 does not necessarily need to output augmented reality image light.

In the case shown in FIG. 5, the transmittance of the reflective units 20 becomes 100%, so that the user of the optical device 200 for augmented reality or an external user is in the state of not being able to view the reflective units 20. Thus, when the optical device 200 for augmented reality is implemented in the form of glasses, it may be used for the use of general glasses in a state in which an augmented reality image is not output.

Figure 6:
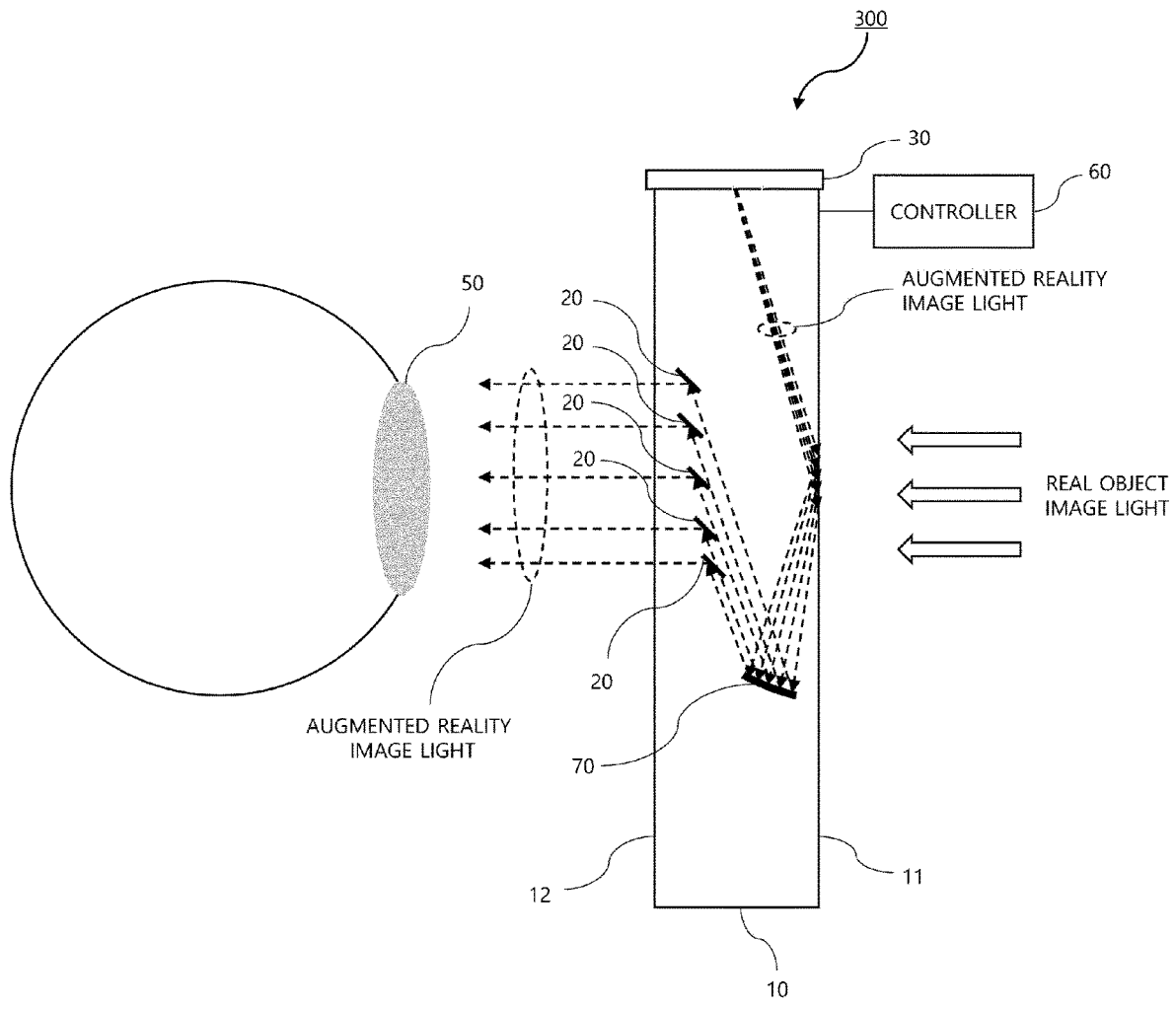
FIG. 6 shows an optical device (300) for augmented reality according to another embodiment of the present invention.

FIG. 6 shows an optical device 300 for augmented reality according to another embodiment of the present invention.

The embodiment of FIG. 6 has the same basic configuration as the embodiments described with reference to FIGS. 2 to 5, however, it is different in that it further includes a second reflective unit 70 configured to function as a collimator. Accordingly, in the embodiment of FIG. 6, an image output unit 30 does not require a component such as a collimator.

In FIG. 6 and the drawings preceding FIG. 6, in order to distinguish the above-described reflective units from the second reflective unit 70, the reflective units 20 shown in FIGS. 2 to 5 are referred to as the first reflective units 20.

The second reflective unit 70 is disposed to be embedded in an optical means 10, and is a means for transferring augmented reality image light, output from the image output unit 30, to first reflective units 20.

In the embodiment of FIG. 6, augmented reality image light output from the image output unit 30 is reflected by total internal reflection on the first surface 11 of the optical means 10 and then transferred to the second reflective unit 70, the augmented reality image light reflected by the second reflective unit 70 is transferred to the plurality of first reflective units 20 in the form of parallel light, and the augmented reality image light reflected by each of the plurality of first reflective units 20 is transferred to the pupil 50.

As shown in FIG. 6, the second reflective unit 70 is disposed to be embedded in the optical means 10 in order to face the image output unit 30 with the first reflective units 20 interposed therebetween.

Furthermore, the second reflective unit 70 is disposed to be embedded in the inside of the optical means 10 between the first and second surfaces 11 and 12 of the optical means 10 in order to reflect image light for augmented reality toward the first reflective units 20.

In other words, the second reflective unit 70 is disposed at an appropriate position inside the optical means 10 between the first and second surfaces 11 and 12 of the optical means 10 by taking into consideration the relative positions of the image output unit 30, the first reflective units 20, and the pupil 50 in order to transfer augmented reality image light, output from the image output unit 30 and then reflected by total internal reflection on the first surface 11 of the optical means 10, to the first reflective units 20 by reflecting the augmented reality image light.

Although the plurality of first reflective units 20 is disposed to become closer to the second surface 12 in the vertically upward direction when viewed from the side of the optical means 10 in the embodiment of FIG. 6, the surface of the second reflective unit 70 on which augmented reality image light is incident is disposed to face the first surface 11, this is merely an example. It is obvious that the first reflective units 20 and the second reflective unit 70 may be disposed in different manners according to their mutual positions in a state in which the optical device 300 for augmented reality is worn by a user.

Since the second reflective unit 70 functions as a collimator, it is preferable that the surface of the second reflective unit 70 on which the augmented reality image light is incident is formed to be concave. Furthermore, the size of the second reflective unit 70 in the widthwise direction thereof is preferably formed to be 8 mm or less, more preferably 4 mm or less, which is smaller than the size of the average pupil of people.

In this case, the widthwise direction of the second reflective unit 70 refers to the length of the second reflective unit 70 in the case where the optical means 10 is viewed from the side, as shown in FIG. 6

In addition, it is preferable that the thickness of the second reflective unit 70 in the case where a user views the second reflective unit 70 through the pupil 50 from a forward position is reduced such that the user rarely recognizes the second reflective unit 70 through the pupil 50.

In the embodiment of FIG. 6, both the first reflective units 20 and the second reflective unit 70 may be formed of state change optical elements such as those described above. It is obvious that only the first reflective units 20 may be formed of state change optical elements or only the second reflective unit 70 may be formed of a state change optical element.

Meanwhile, the reflectance and transmittance of at least some of the plurality of first reflective units 20 and the second reflective unit 70 may be different from those of the one or more remaining reflective units 20 and/or 70. In other words, the reflectance and transmittance of the plurality of first reflective units 20 and the second reflective unit 70 may not all be the same.

Figure 7:
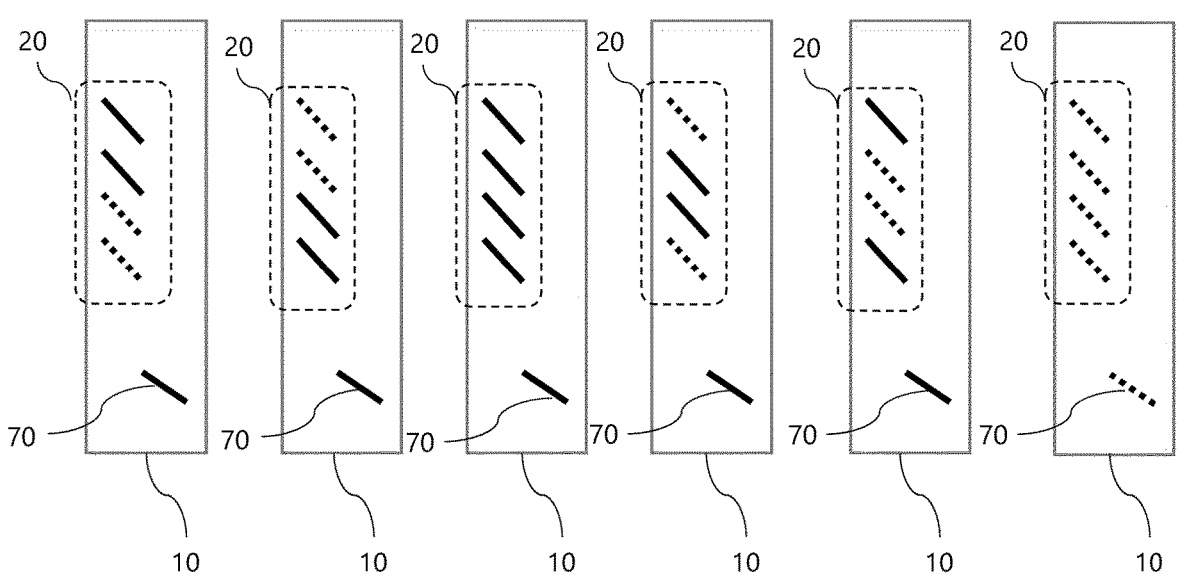
FIG. 7 shows a case where the reflectance and transmittance of a plurality of first reflective units (20) and a second reflective unit (70) according to the present invention are set in various manners.

FIG. 7 shows a case where the reflectance and transmittance of a plurality of first reflective units 20 and a second reflective unit 70 according to the present invention are set in various manners.

In FIG. 7 and the drawings preceding FIG. 7, for convenience of description, when viewed from the side of the optical means 10, the first reflective units 20 are disposed alongside each other, and the surface of the second reflective unit 70 is also shown in a flat shape. However, it should be noted that the present invention is not limited to this configuration and this configuration is a simplified form for convenience of description.

In FIG. 7, a solid line denotes a state in which the reflectance is 100% and the transmittance is 0%, whereas a dotted line denotes a state in which the reflectance is 0% and the transmittance is 100%.

As shown in FIG. 7, the reflectance and transmittance of the first reflective units 20 and the second reflective unit 70 may be selectively adjusted. Accordingly, for example, when it is necessary to provide an augmented reality image to only a specific part of the first reflective units 20, only the corresponding first reflective unit 20 may be converted into a full mirror state, and the one or more remaining first reflective units 20 may be maintained in a transparent state. Therefore, an advantage is achieved in that the transmittance for real object image light may be increased.

As a result, a user may more clearly recognize real object image light, and an external user feels less awkward because he or she also recognizes the minimized first reflective units 20.

Meanwhile, the reflectance and transmittance of the first reflective units 20 may be changed between 0 and 100% as described above. For example, in the case of the electrochemical method described with reference to FIGS. 3 and 4, the reflectance and transmittance of the first reflective units 20 may be adjusted between 0 and 100% as needed by adjusting the magnitude of the voltage through the controller 60. It is obvious that the same applies to the second reflective unit 70.

Figure 8:
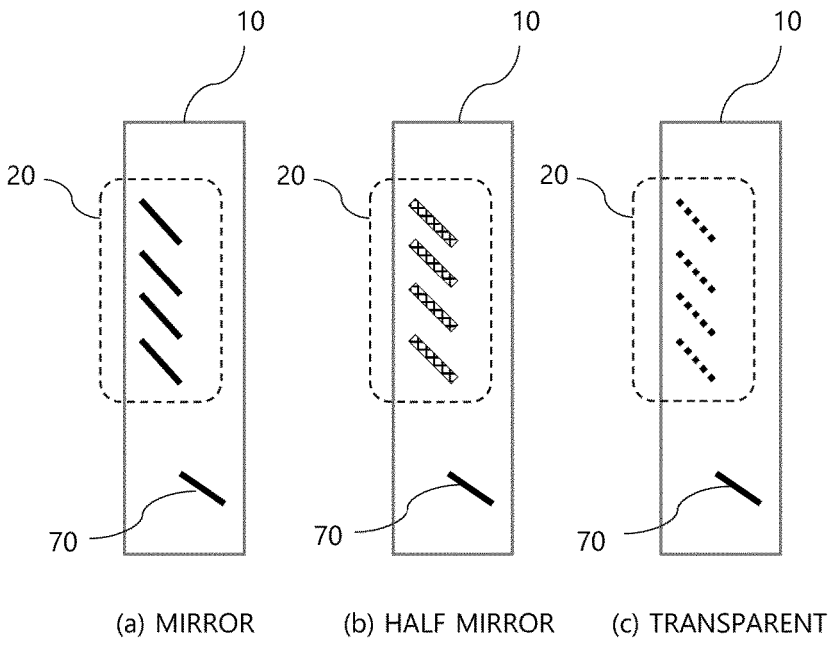
FIG. 8 shows the optical device (300) for augmented reality in a case where the reflectance and transmittance of the first reflective units (20) are changed between 0 and 100%.

FIG. 8 shows the optical device 300 for augmented reality in a case where the reflectance and transmittance of the first reflective units 20 are changed between 0 and 100%.

In FIG. 8, a solid line denotes a full mirror, a lattice pattern denotes a half mirror, and a dotted line denotes a transparent state.

When the reflectance of the first reflective units 20 is 100% and the transmittance thereof is 0% as shown in FIG. 8(*a*) on the left side of FIG. 8, the first reflective units 20 become opaque, which means that the first reflective units 20 act as full mirrors.

Furthermore, when the reflectance of the first reflective units 20 is 50% and the transmittance thereof is 50% as shown in FIG. 8(b) at the center of FIG. 8, the first reflective units 20 become translucent, which means that the first reflective units 20 act as half mirrors.

Moreover, when the reflectance of the first reflective units 20 is 0% and the transmittance thereof is 100% as shown in FIG. 8(c) on the right side of FIG. 8, it means that the first reflective units 20 become completely transparent.

Figure 9:
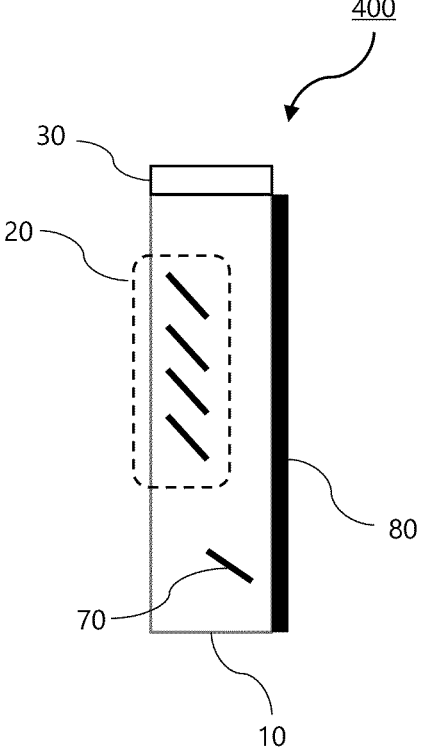
FIGS. 9 to 11 are diagrams showing an optical device (400) for augmented reality according to still another embodiment of the present invention.
Figure 10:
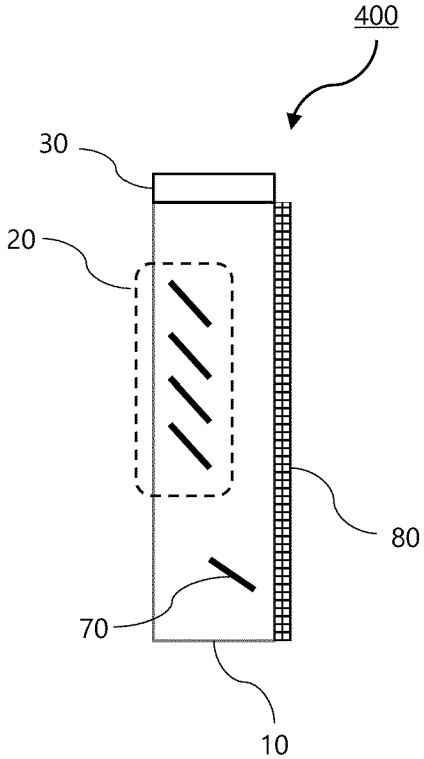
Figure 11:
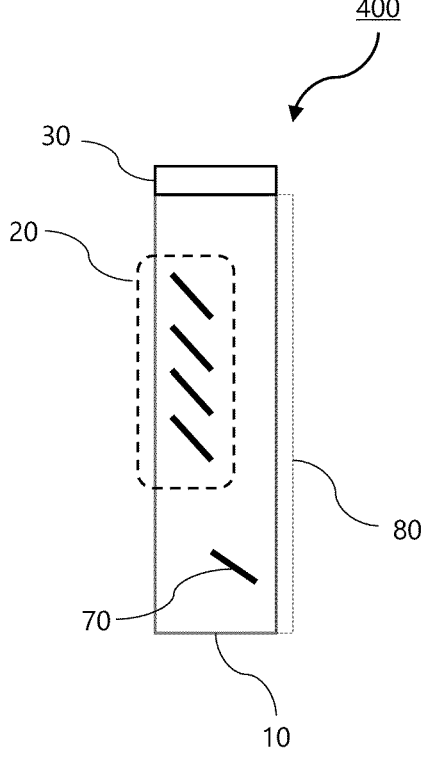

FIGS. 9 to 11 are diagrams showing an optical device 400 for augmented reality according to still another embodiment of the present invention.

Although the optical device 400 for augmented reality of FIGS. 9 to 11 is basically the same as the optical device 300 for augmented reality described with reference to FIG. 6, it is different in that a light transmission adjustment means 80 formed of a state change optical element such as that described above is additionally disposed on the first surface 11 of an optical means 10.

Therefore, an advantage is achieved in that adjustment to an opaque state (see FIG. 9), a translucent state (see FIG. 10), or a fully transparent state (see FIG. 11) for real object image light, which is external light, may be performed by adjusting the state of the light transmission adjustment means 80 as described above.

In FIGS. 9 to 11, the first reflective units 20 may be formed of state change optical elements, or may be formed of general reflective means having a reflectance of 100% instead of state change optical elements.

It is obvious that when the first reflective units 20 are formed of state change optical elements, the states thereof may be adjusted independently of the light transmission adjustment means 80.

Furthermore, although the light transmission adjustment means 80 is disposed on the outer surface of the first surface 11 of the optical means 10 in FIGS. 9 to 11, it may be disposed on the inner surface of the first surface 11.

Meanwhile, although the light transmission adjustment means 80 is formed to correspond to the overall size of the first surface 11 in the embodiment of FIGS. 9 to 11, it may be formed to correspond to the size of a partial region of the first surface 11 as needed.

Furthermore, a configuration may be made such that the light transmission adjustment means 80 itself is formed to correspond to the overall size of the first surface 11 and a region whose state is changed is partially adjusted. In this case, the region whose state is changed may be determined according to the states of the first reflective units 20.

Figure 12:
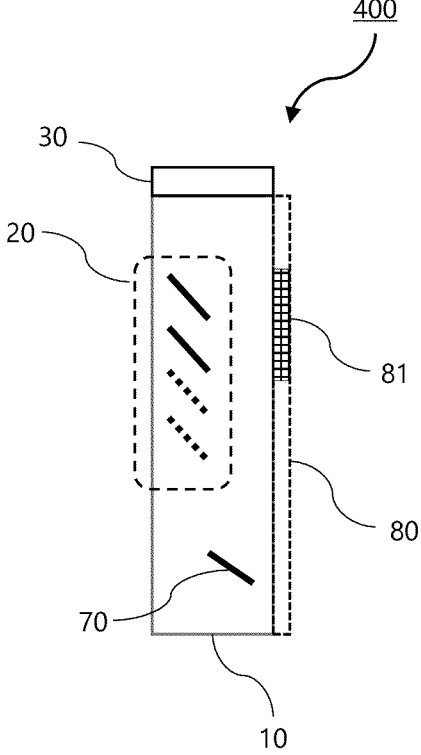
FIG. 12 is intended to illustrate a case where the region of a light transmission adjustment means (80) whose state is changed is partially adjusted.

FIG. 12 is intended to illustrate a case where the region of the light transmission adjustment means 80 whose state is changed is partially adjusted.

Referring to FIG. 12, when the two upper first reflective units 20 of the plurality of first reflective units 20 are in an opaque state (reflectance: 100%, and transmittance: 0%), the state of the region 81 of the overall area of the light transmission adjustment means 80 corresponding to the first reflective units 20 in an opaque state may be adjusted to a translucent state, and the remaining region may be adjusted to a transparent state.

This is based on the principle that in the case where an image for augmented reality is provided to the pupil 50 using only a part of the plurality of first reflective units 20, when the region 81 of the light transmission adjustment means 80 corresponding to one or more first reflective units 20 used is adjusted to a slightly darkened translucent state, both the image for augmented reality and real object image light are clearly visible.

Figure 13:
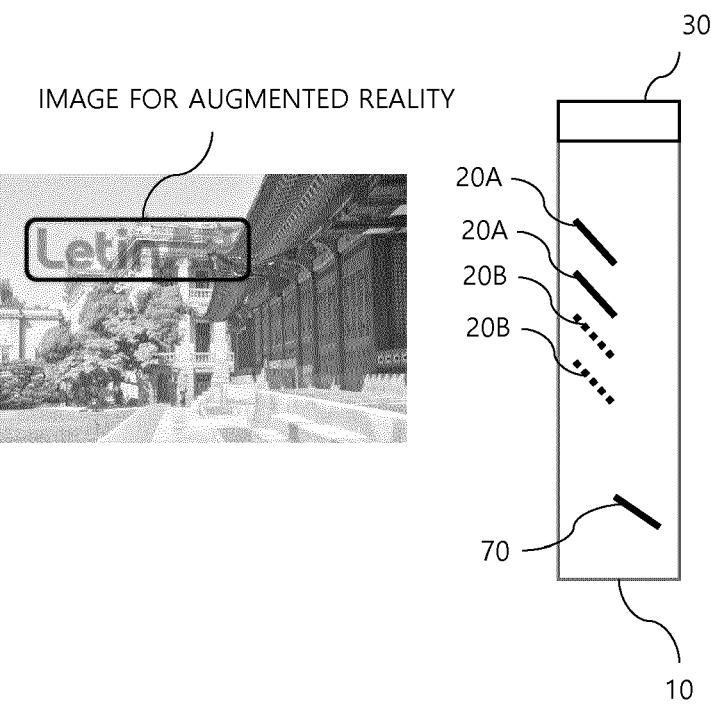
FIGS. 13 to 15 are intended to illustrate effects in a case where the region of the light transmission adjustment means (80) whose state is changed is partially adjusted.
Figure 14:
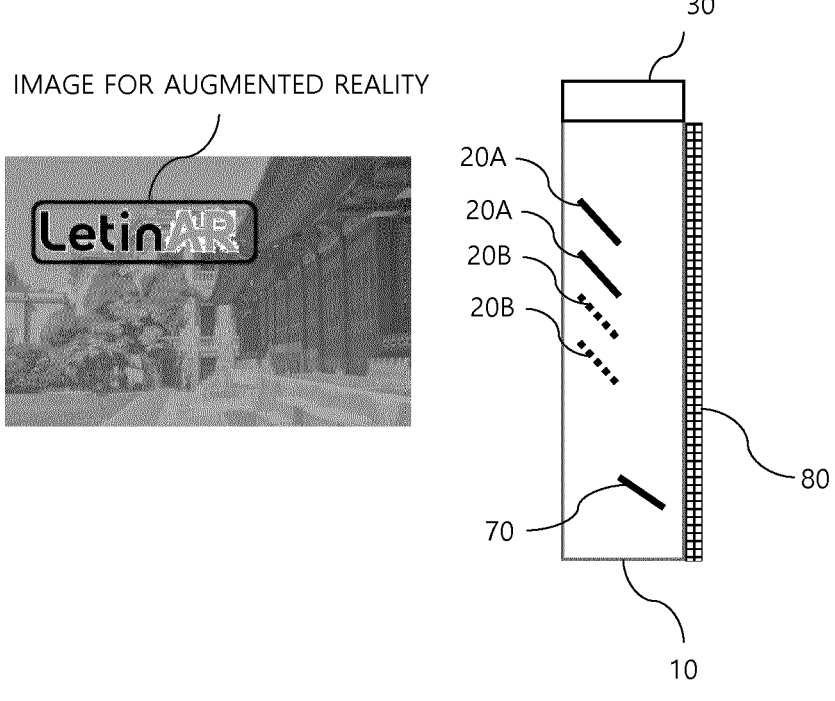
Figure 15:
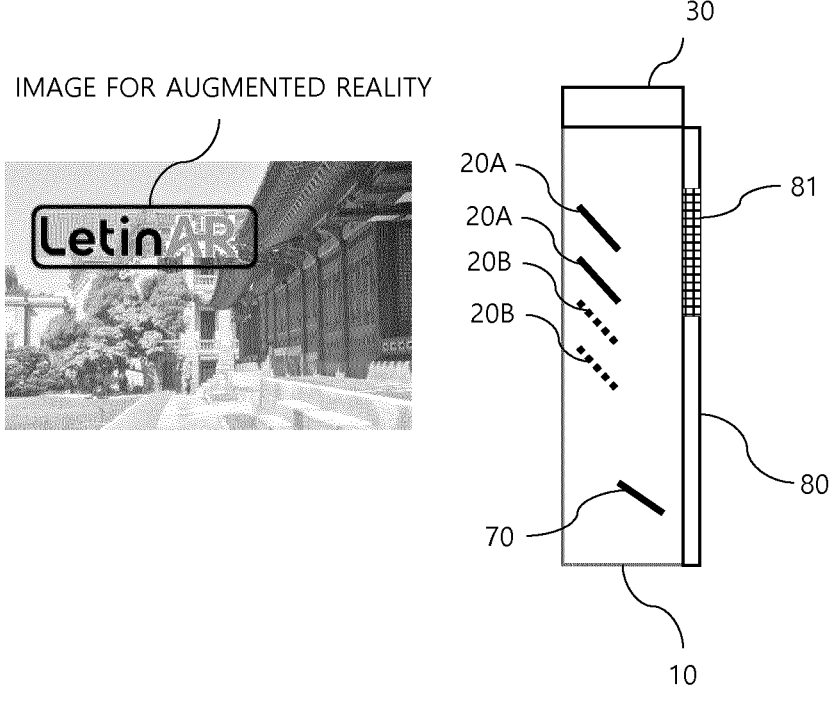

FIGS. 13 to 15 are intended to illustrate effects in a case where the region of the light transmission adjustment means 80 whose state is changed is partially adjusted.

FIG. 13 shows a case where the two upper first reflective units 20A of the first reflective units 20 are in an opaque state (reflectance: 100%, and transmittance: 0%) and the two lower first reflective units 20B thereof are in a transparent state (reflectance: 0%, and transmittance: 100%). In this case, a user is provided with the image for augmented reality "LetinAR" overlaid on real object image light, as shown on the left side of FIG. 13. In this case, objects in the real world are clearly visible, whereas the image for augmented reality is relatively invisible because external light is excessively bright.

FIG. 14 shows a case where the light transmission adjustment means 80 is changed to a translucent state in the state shown in FIG. 13 so that less real world image light is transmitted. In this case, a user is provided with an image for augmented reality, as shown on the left side of FIG. 14. Compared to the case of FIG. 13, the image for augmented reality is relatively clearly visible, whereas objects in the real world appear darker.

FIG. 15 shows a case where only the region 81 of the overall area of the light transmission adjustment means 80 corresponding to the first reflective units 20A in an opaque state is changed to a translucent state in the state shown in FIG. 13. In this case, it can be seen that both an image for augmented reality and objects in the real world are clearly visible compared to the case of FIG. 14.

Figure 16:
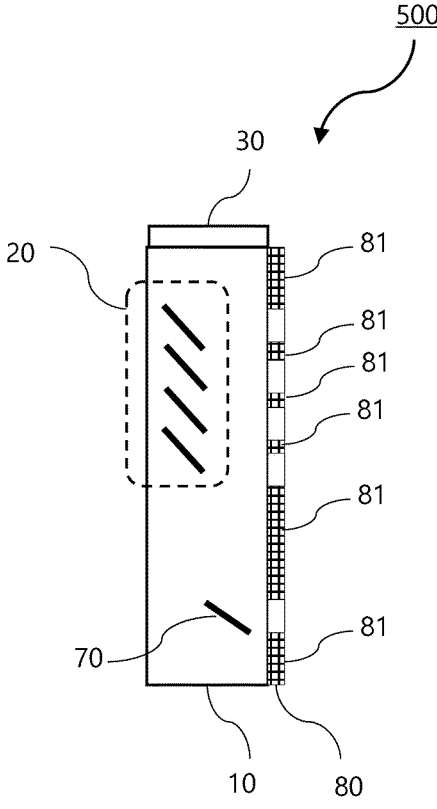
FIG. 16 is a diagram showing an optical device (500) for augmented reality according to still another embodiment of the present invention.

FIG. 16 is a diagram showing an optical device 500 for augmented reality according to still another embodiment of the present invention.

Although the embodiment of FIG. 16 is similar to the embodiment of FIG. 12, it is different in that the regions of the light transmission adjustment means 80 whose states are changed are preset to regions other than all regions corresponding to first reflective units 20 and a second reflective unit 70.

Figure 17:
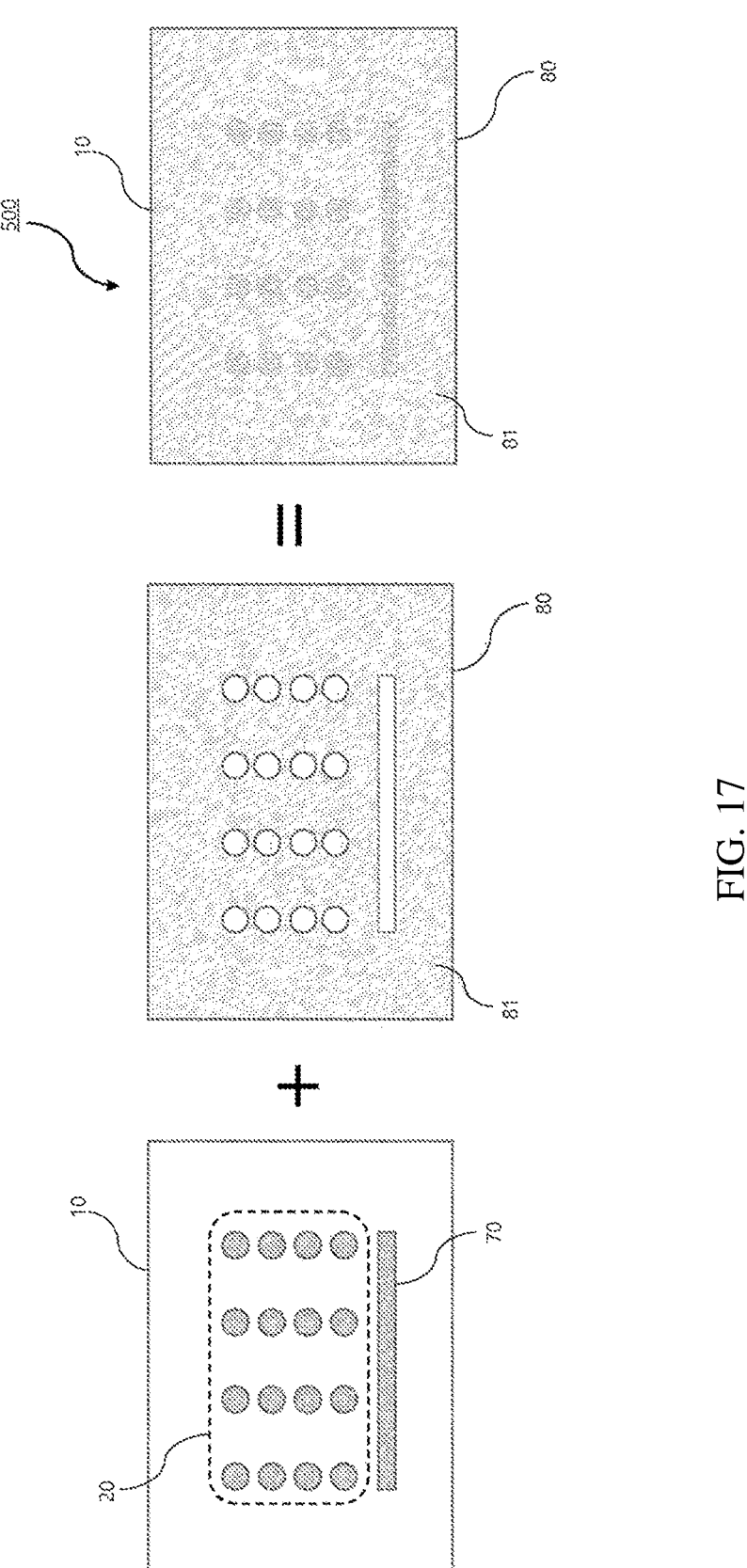
FIG. 17 shows views illustrating the effect of the optical device (500) for augmented reality according to the embodiment of FIG. 16.

FIG. 17 shows views illustrating the effect of the optical device 500 for augmented reality according to the embodiment of FIG. 16.

The left view of FIG. 17 is a front view of the optical device 500 for augmented reality in a state without the light transmission adjustment means 80, and the central view of FIG. 17 is a front view of the light transmission adjustment means 80.

As shown in the left view of FIG. 17, when the optical device 500 for augmented reality in a state without the light transmission adjustment means 80 is viewed from the outside, the first reflective units 20 and the second reflective unit 70 are clearly visible, and thus it may give a relatively awkward feeling.

As shown in the central view of FIG. 17, the regions of the light transmission adjustment means 80 whose states are changed are set to regions other than all regions corresponding to the first reflective units 20 and the second reflective unit 70, and thus a front view of the state in which the light transmission adjustment means 80 and the optical means 10 are combined with each other appears as shown in the right view of FIG. 17.

Therefore, even when the optical device 500 for augmented reality is viewed from the outside, an advantage is achieved in that it is not awkward because the overall appearance thereof appears uniform and thus the first reflective units 20 and the second reflective unit 70 do not stand out significantly.

While the embodiments according to the present invention have been described above, it is obvious that the present invention is not limited to the embodiments.

For example, although the state change optical elements have been described based on the electrochemical principle, it is obvious that state change optical elements based on cholesteric liquid crystal technology may also be applied to the present invention. Furthermore, it is obvious that state change optical elements based on technologies other than the electrochemical scheme may be employed.

Furthermore, it is obvious that the arrangement structure of the reflective units (or the first reflective units) 20 and the second reflective unit 70 described in the above-described embodiments is merely an example and the present invention is not limited thereto.

DESCRIPTION OF REFERENCE SYMBOLS

100 . . . optical device for augmented reality
200, 300, 400, 500 . . . optical device for augmented reality using state change optical elements
10 . . . optical means
20 . . . reflective unit, first reflective unit
30 . . . image output unit
40 . . . frame unit
50 . . . pupil
60 . . . controller
70 . . . second reflective unit
80 . . . light transmission adjustment means

The invention claimed is:

1. A lightweight optical device for augmented reality using a state change optical element, the lightweight optical device comprising:

an optical means configured to transmit at least part of real object image light therethrough toward a pupil of an eye of a user; and a reflective unit disposed inside the optical means, and configured to transfer augmented reality image light, output from an image output unit, toward the pupil of the eye of the user by reflecting the augmented reality image light, thereby providing an image for augmented reality to the user;

wherein the reflective unit is formed of a state change optical element whose reflectance for reflection of light and transmittance are changed in response to a control signal of a controller;

wherein reflectance and transmittance of the reflective unit are each changed in a range of 0 to 100%; and wherein the reflective unit includes a plurality of reflective units, and reflectance and transmittance of at least some of the reflective units are different from those of one or more remaining reflective units.

2. The lightweight optical device of claim 1, wherein the reflective unit comprises:

a first substrate made of a transparent material;

a second substrate disposed to face the first substrate;

a first electrode formed on the first substrate, and made of a transparent material;

a second electrode formed on the second substrate, and made of a transparent material; and an electrolyte including metal ions contained in a space between the first and second electrodes;

wherein the first and second electrodes are electrically connected to the controller.

3. The lightweight optical device of claim 2, wherein when a voltage is applied from the controller to the first and second electrodes, the metal ions included in the electrolyte are electrodeposited on one of the first and second electrodes and form a metal thin film.

4. A lightweight optical device for augmented reality using a state change optical element, the lightweight optical device comprising:

an optical means configured to transmit at least part of real object image light therethrough toward a pupil of an eye of a user;

a reflective unit disposed inside the optical means, and configured to transfer augmented reality image light, which is image light corresponding to an image for augmented reality output from an image output unit, toward the pupil of the eye of the user by reflecting the augmented reality image light, thereby providing the image for augmented reality to the user; and a light transmission adjustment means disposed on an outer surface or inner surface of a first surface of the optical means on which the real object image light is incident;

wherein the reflective unit is formed of a state change optical element whose reflectance for reflection of light and transmittance are changed in response to a control signal of the controller; and wherein the light transmission adjustment means is formed of a state change optical element whose reflectance for reflection of light and transmittance are changed in response to a control signal of a controller.

5. The lightweight optical device of claim 4, wherein reflectance and transmittance of the light transmission adjustment means are each changed in a range of 0 to 100%.

6. The lightweight optical device of claim 4, wherein reflectance and transmittance of the reflective unit are each changed in a range of 0 to 100%.

7. The lightweight optical device of claim 6, wherein reflectance and transmittance of a region of the light transmission adjustment means corresponding to the reflective unit are changed.

8. The lightweight optical device of claim 6, wherein reflectance and transmittance of a region of the light transmission adjustment means other than a region of the light transmission adjustment means corresponding to the reflective unit are changed.

* * * * *